United States Patent Office 2,972,140
Patented Feb. 14, 1961

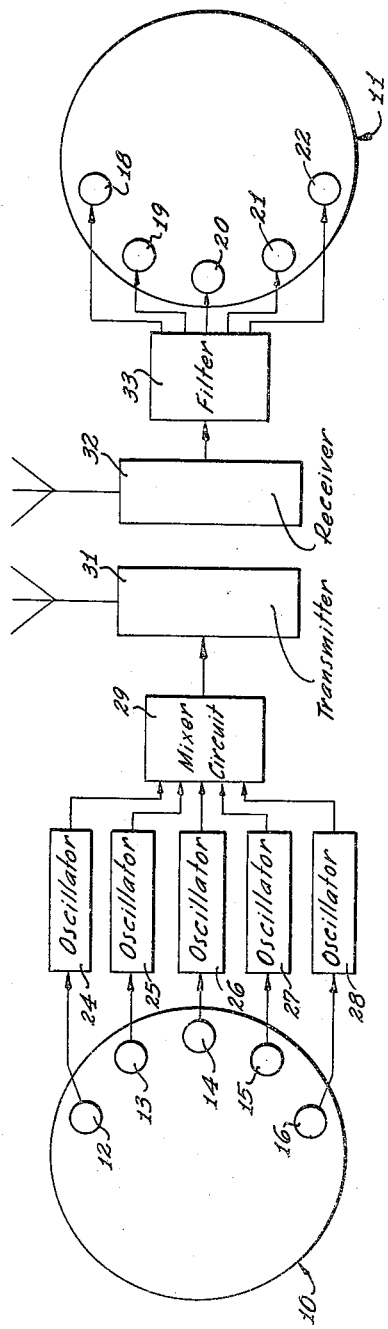

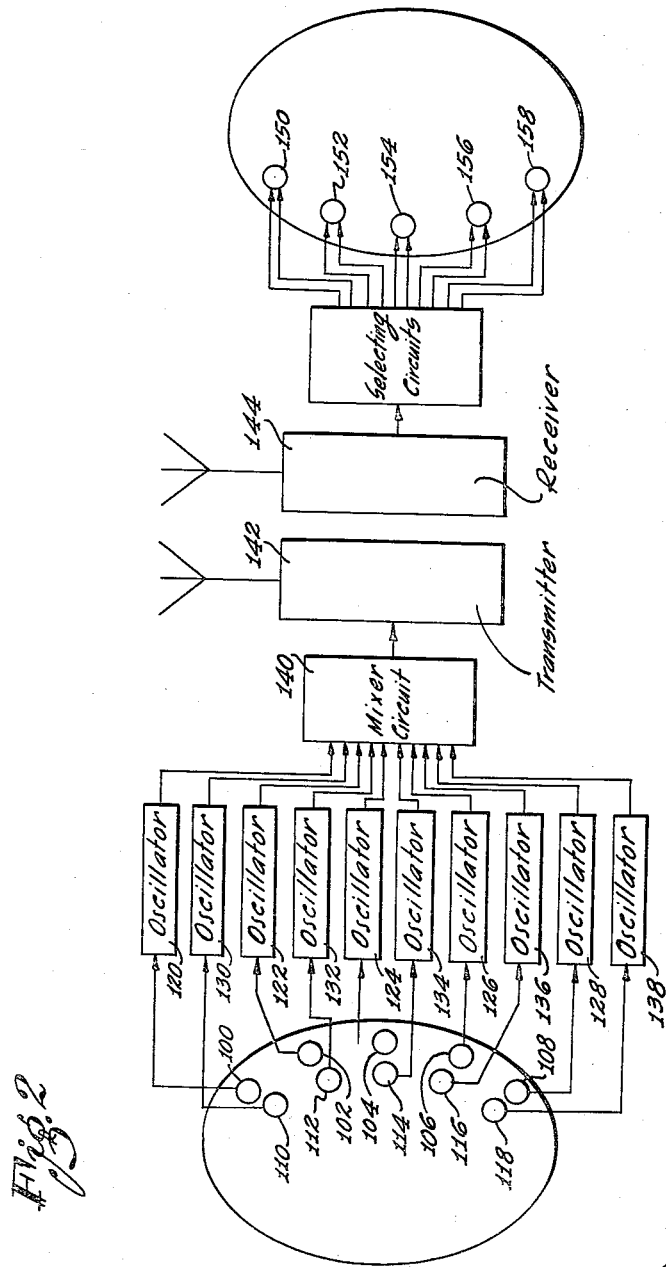

2,972,140

APPARATUS AND METHOD FOR COMMUNICATION THROUGH THE SENSE OF TOUCH

Joseph Hirsch, Pacific Palisades, Calif.
(Technion, Haifa, Israel)

Filed Sept. 23, 1958, Ser. No. 762,727

4 Claims. (Cl. 340—407)

This is a continuation-in-part of copending application Serial No. 465,315 filed October 28, 1954 by Joseph Hirsch for "Apparatus and Method for Communication Through the Sense of Touch," now abandoned.

This invention relates to a system of communication, and more particularly to an apparatus and method for long distance communication through the sense of touch. In essence, the invention is a system of communication in which vibratory stimuli and tactile perception are used to replace the visual and auditory means.

At present there exists no successful apparatus by which a person both deaf and blind may carry on satisfactorily continuous communication between another deaf and blind person located at a remote point. Furthermore, and even in the case of persons not deaf and blind and possessing all of their senses, present systems of long distance communication are subject to certain distinct limitations, particularly with respect to the time lag between the creation of an idea in the mind of the transmitting operator and reception and action upon the idea by the mind and body of the receiving operator. For example, intercom systems on military ships and aircraft are frequently not able to transmit in a sufficiently short period of time the urgent signals which must be sent from lookout personnel to central control or gunnery stations. In addition, some signals transmitted automatically by devices on military aircraft, for example, must be converted immediately into action by a ground observer or control man, and this cannot be done with sufficient rapidity by the visual or auditory means which might be employed.

In view of the above factors characteristic of communication systems of the visual or auditory type, and particularly with relation to communication by deaf and blind persons, it is an object of the present invention to provide an apparatus and method by which persons may communicate with extreme rapidity over a long distance through use of vibratory stimuli and tactile perception.

Another object of the invention is to provide an apparatus and method by which information may be transmitted over a long distance and converted rapidly into intelligence at the receiving end, the intelligence being received in vibratory form and through use of the sense of touch of the receiver.

Another object of the invention is to provide improved means usable in systems of instrumentation and automatic controls for perception of data and other information, particularly in situations where the conventional auditory and visual perception methods are excessively slow or impractical.

A further object of the invention is to provide an improved apparatus for transmitting vibrations over a long distance for perception by the sense of touch of the receiver.

An additional object is to provide a system making use of permutations and combinations of vibrations of a number of selected frequencies and amplitudes, which constitute channels of information over which signals or combinations of signals may be transmitted to represent intelligence such as speech, or scientific data such as velocity, accelerations, pressure, voltage, current, or the like.

These and other objects and advantages of the invention will be more fully set forth in the following specification and claims considered in connection with the attached drawing, in which an embodiment of the invention for use in deaf and blind communication is illustrated.

Stated generally, the invention contemplates the provision of means by which intelligence in the form of scientific data, letters of the alphabet, basic English, etc., is transmitted either over wires or by wireless communication to a receiving point at which it is converted into vibratory form and sensed by the sense of touch of a receiving operator. The preferred embodiment of the invention makes use of a number of transmitting and receiving channels, with each channel serving to transmit a particular frequency so that the permutations and combinations of the frequencies transmitted may be made to correspond to the alphabet or other symbols at the point of reception.

Referring now to the drawing, there is illustrated a sending or "speaker" board 10 and a receiving or "listening" board 11, each board having five key elements mounted thereon for engagement, respectively, by the fingers of the operator. More specifically, the sending board 10 is provided with keys 12, 13, 14, 15 and 16 for respective engagement by the thumb, index, middle, third and little fingers of the sender. Correspondingly, receiving board 11 has keys 18, 19, 20, 21 and 22 for engagement by the thumb, index, middle, third and little fingers of the receiver. As thus described, the sending operator or speaker employing board 10 will use his right hand whereas a receiving operator employing board 11 will use his left hand, the object being that a signal transmitted from the thumb of the sender, for example, will be received by the thumb of the receiver. It is to be understood that in addition to the system shown in the drawing a duplicate but reversed system is provided so that the receiver in the illustrated system may become the sender and send signals from his right hand for reception by the left hand of the illustrated sender. In this way, two way communication is effected by the sense of touch as will next be described.

According to the invention, a channel of long distance communication is provided between key 12 and key 18, key 13 and key 19, etc., and such that pressing of key 12 or key 13, etc., produces different frequency vibrations of keys 18 and 19, etc. More specifically, keys 12—16 are associated, respectively, with suitable oscillators 24—28 and in such a way that pressing of key 12, for example, causes oscillator 24 to produce oscillations of a given frequency. Pressing of key 13, for example, causes oscillator 25 to produce a different frequency oscillation, and the remaining keys 14—16 cause their associated oscillators 26—28 to oscillate at other frequencies. Each key 12—16 may comprise a normally open button switch connected to effect energization of its associated oscillator upon being pressed. In the illustrated example oscillator 24 is preferably adapted to oscillate at twenty cycles per second, oscillator 25 at fifty cycles per second, oscillator 26 at one hundred twenty cycles per second, oscillator 27 at two hundred seventy cycles per second, and oscillator 28 at seven hundred cycles per second.

The outputs of the oscillators 24—28 are fed into a suitable mixer circuit 29 and in which frequencies, received from those of oscillators 24—28 which are in operation, are converted into a single wave containing the individual oscillator frequencies. Mixer circuit 29, in turn, feeds into a radio transmitter 31 in which the mixed frequency wave is impressed on a suitable carrier radio wave for transmission through space to a suitable radio receiver 32 located at a remote point. Alternatively, a wire or telephone communication may be employed instead of the wireless communication illustrated.

The radio wave received by receiver 32 is demodulated and the resulting wave, corresponding to that produced in mixer circuit 29, is fed into a suitable filter 33 which separates the several frequencies and feeds them to the respective receiving keys 18—22. The construction and connection of the filter 33 is such that the twenty cycle per second wave from transmitter key 12 and oscillator 24 is received at key 18, the fifty cycle wave from key 13 and oscillator 25 is received at key 19, etc. Each receiver key 18—22 comprises a suitable electro-mechanical transducer such as a diaphragm adapted to vibrate at the frequency transmitted to it, so that key 18 will vibrate at twenty cycles per second, key 19 at fifty cycles per second, etc.

The described system comprises one simple and effective way by which movement of the finger or hand of a sender or speaker effects vibration of an element at the finger or hand, or at any part of the body, of the receiver or listener. An alternative wound be to employ photoelectric means in place of sending keys 12—16, it being understood that the sender's hand can be manipulated to close keys, or to interrupt light beams aimed at photoelectric means in order to control the separate oscillators 24 to 28. Furthermore, a frequency board which generates oscillations of different frequencies by movement of the speaker's hand over the board, through change in body capacity, could be employed. The invention also contemplates the use of frequency selective transducers at the receiving keys 18—22, and the use of separate subcarrier radio waves by which each signal is transmitted over a separate sub-carrier.

In the operation of the illustrated system, a code may be employed by which pressing of key 12 and consequent reception at key 18 of a twenty cycle per second signal represents the letter *a*, pressing of key 13 the letter *b*, key 14 the letter *c*, key 15 the letter *d*, and key 16 the letter *e*. Simultaneous pressing of keys 12 and 13 would then represent the letter *f*, simultaneous pressing of keys 12 and 14, the letter *g*, etc. Since the permutations and combinations of keys 12—16 are 31 in number, it follows that at least the twenty-six letters of the alphabet may be transmitted and received with the simple system illustrated.

Because of the fact that each key 18—22 vibrates at a different frequency, the reception by the receiver of a number of signals at the same time is facilitated, and deaf and blind persons can, particularly because of their extraordinary sense of touch, communicate very rapidly. As previously stated, a corresponding system is provided by which the "listener" at board 11 becomes the "sender" for another board and system, not shown.

The system has the further advantage that timing of the signals may be incorporated into the code to substantially increase the number of code symbols which may be transmitted and received. Thus if keys 12 and 14 are pressed at predetermined intervals, for example, this may be employed to mean different symbols such as letters of the alphabet and other intelligence. Furthermore, emphasis may be achieved by variation in the force with which keys 12—16 are pressed.

An extension of this system to increase the number of channels of information would permit the carrying on of one to one correspondence in, for example, basic English. The sender could then send words at a speed much greater than can presently be effected by teletypes or other means. Furthermore, properly trained operators may use the suggested system to communicate in a faster and more accurate manner than can be presently effected by speaking.

It is to be understood that the keys 12—16 may be built into the control wheel of an airplane so that the pilot grasping the wheel can transmit information both to the ground and to the other occupants of the plane. Furthermore, it is within the scope of the invention for the signals to be transmitted automatically, as by devices on an airplane for determining and signalling the yaw, pitch, roll, etc. of the airplane to a ground observer using a board 11 and keys 18—22. The ground observer can thus receive intelligence very rapidly and in the dark, and can use such intelligence to direct the airplane pilot into a blind landing.

The system constituting the invention may also be considerably extended in scope as to the amount of information capable of being transmitted at any instant. The system may be extended in this manner by including the embodiment shown in Figure 2. In that embodiment, a first plurality of keys 100, 102, 104, 106 and 108 are disposed in spaced relationship to each other at positions corresponding to the relative disposition of the different fingers on an operator's hand. The keys 100, 102, 104, 106 and 108 may be spring-loaded so that switches disposed below the keys are normally open. The switches may become closed upon an actuation or depression of the keys.

In like manner, a second plurality of keys 110, 112, 114, 116 and 118 are disposed at spaced positions corresponding to the relative positioning of the keys 100, 102, 104, 106 and 108. The keys 110, 112, 114, 116 and 118 are preferably disposed at equal distances from the keys 100, 102, 104, 106 and 108, respectively, and are adapted to close switches upon the actuation of the keys.

Oscillators 120, 122, 124, 126, 128, 130, 132, 134, 136 and 138 are respectively coupled to the keys 100, 102, 104, 106, 108, 110, 112, 114, 116, 118 so as to become energized upon the actuation of the associated keys. The oscillators 120 to 138, inclusive (even numbers only), are provided with individual frequencies so that the signals from each oscillator will be distinctive relative to the signals from any other oscillator or from any other combination of oscillators. For example, the oscillators 120 to 138, inclusive (even numbers only), may be respectively constructed to produce signals having frequencies of 30, 50, 70, 110, 130, 420, 870, 1780, 3700 and 7800 cycles per second respectively. It will be appreciated that other suitable combinations of frequencies may also be used.

The signals produced at any instant by the different oscillators shown in Figure 2 are introduced to a mixer circuit 140 so that a composite signal having the frequency of the different oscillators is obtained. By providing the oscillators with individual and particular frequencies relative to the frequencies of the signals from all of the other oscillators, the composite signal produced in the mixer 140 can be separated into the proper signals of different frequencies without any spurious signals resulting from the beat of the different signals being mixed. For example, even signals might be simultaneously produced by the oscillators 120 and 122 at frequencies of 30 and 50 cycles per second such that beat frequency signals at 30+50=80 cycles per second are obtained. These signals would not be equivalent to the production of signals at 70 cycles per second by the oscillator 124.

The composite signals produced in the mixer 140 are introduced to a transmitter 142 for transmission to a removed position at which a receiver 144 is located. The transmission may occur either on a wireless basis such as by a radio transmitter or through wires such as coaxial telephone lines. The signals are then introduced to selective circuits 146 which may be in the nature of parallel resonant circuits or filters or both. For example, 10 selective circuits may be provided, each resonant at the frequency of the signals from a different one of the oscillators 120 to 138 inclusive (even numbers only). One selective circuit may be resonant at 30 cycles per second to pass the signals produced by the oscillator 120 and to pass no other signals. Similarly, another selective circuit may be resonant at a frequency of 3700 cycles per second to pass the signals from the oscillator 136 and to pass no other signals.

A plurality of keys 150, 152, 154, 156 and 158 are disposed at removed positions and in a spaced relationship corresponding to that of the keys 100, 102, 104, 106, and 108. The key 150 is adapted to receive the signals passing through the selective circuits 146 from the oscillators 120 and 130. Similarly, the keys 152, 154, 156 and 158 receive the signals produced by the oscillators 122 and 132, the oscillators 124 and 134, the oscillators 126 and 136 and the oscillators 128 and 138, respectively.

Since the signals from the different oscillators have individual frequencies, they cause different tactile stimuli to be imparted through the keys to fingers which are disposed on the keys. For example, the thumb may receive signals at a low frequency from the oscillator 128 and at a high frequency from the oscillator 138. Similarly, the middle finger has signals applied to it at 70 cycles per second from the oscillator 124 and at 1780 cycles per second from the oscillator 134.

In like manner, each of the other fingers in the hand of an operator at the removed position receives signals at a low frequency and signals at a relatively high frequency. The signals at the low and high frequencies may be introduced to each finger simultaneously at some times, and the signals at only one of the frequencies may be introduced to the finger at other times. Because of the considerable difference in the frequencies of the signals transmitted to each finger in the hand of an operator, the operator is able to distinguish on a tactile basis between the different signals.

By providing two pluralities of transmitter keys and by having each key control the transmission of signals at a different frequency, a relatively great number of different combinations of frequencies can be obtained. For example, as many as 637 different combinations of signals can be produced for transmission. If each combination is made to represent a different piece of information such as a word which is frequently used in ordinary speech tactile communication of a considerable amount of information can be obtained in a relatively short time between the transmitting position and the position of reception. This is especially important in connection with the training of deaf and blind people, since the only sense of communication with these people is through the touch system.

It should be appreciated that certain modifications can be made without departing from the scope of the embodiment shown in Figure 2. For example, one plurality of keys can be used to control the frequencies of the signals from the oscillators at any instant. The keys can be associated with switches to energize the oscillators 120, 122, 124, 126 and 128 upon a depression of the keys through a first distance. Similarly, the keys can obtain the production of signals from the oscillators 130, 132, 134, 136 and 138 upon the depression of the keys through a second distance greater than the first distance. When a key is depressed through third distances greater than the first and second distances, signals are obtained from a pair of oscillators, one at a low frequency and the other at a high frequency. This would correspond to the production of signals at 70 and 1780 cycles per second by a simultaneous depression of the keys 104 and 114.

It will also be appreciated that the invention is not necessarily limited to the use for transmission of one plurality of keys as in Figure 1 or two pluralities of keys as in Figure 2. Actually, three or more pluralities of keys may also be used in which each plurality of keys includes five keys, one for actuation by each finger of the operator's hand. Keys for actuation by the fingers of the operator's other hand may also be used. With increased pluralities of keys, the possible combinations of different signals become further increased. Since each individual combination of signals can be made to represent a different bit of information, the flexibility in communication becomes correspondingly enhanced.

It will also be appreciated that the apparatus constituting this invention can be used for other purposes than to provide a communication with the deaf and blind. For example, the apparatus can also be used to provide a communication between an airplane and a ground station or for any other purpose between any two separated points.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for providing a tactile communication of information from a first position by a first operator to a second position for reception and assimilation of the information by a second operator, a first plurality of keys disposed in a first row at the first position in a spaced arrangement corresponding to the relative spacing between the fingers of the first operator, a second plurality of keys disposed at the first position in a second row spaced from the first row and disposed in a spaced arrangement corresponding to the relative spacing between the fingers of the first operator, a plurality of oscillators each operative upon actuation of a different key of the first and the second pluralities of keys for producing signals at an individual frequency relative to the frequencies of the signals produced by the other oscillators or any group of oscillators, electrical circuitry including a mixer coupled to the oscillators for combining the signals from the operative oscillators, electrical circuitry at the second position and responsive to the signals from the mixer for separating the signal into the oscillatory signals of the different frequencies, and means including a third plurality of keys disposed in spaced relationship at the second position and in an arrangement corresponding to the separation between the different fingers of the second operator and responsive to signals at particular frequencies corresponding to the frequencies of the signals produced by the actuation of the keys in the first and second pluralities for obtaining an actuation of the keys to provide a tactile stimulation of the fingers of the second operator.

2. In combination for providing a tactile communication of information from a first position by a first operator to a second position for reception and assimilation of the information by a second operator, a plurality of oscillators each operative to produce signals at an individual frequency, means including a mixer for combining the signals from the oscillators operative at any instant to obtain the transmission of the composite signal to the second position, a first plurality of keys disposed at the first position in spaced relationship to one another for operation by the fingers of the first operator and each coupled individually to a particular one of first oscillators in the plurality for making the coupled oscillator operative upon an actuation of its coupled key by one of the fingers of the first operator, a second plurality of keys disposed at the first position in spaced relationship to one another and each coupled individually to second oscillators in the plurality for making the coupled oscillator operative upon an actuation of its coupled key by a particular finger of the first operator, receiving means at the second position for receiving the composite signal from the first position, means coupled to the receiving means for individually separating the oscillatory signals at the different frequencies in the composite received signal, and means at the second position including a second plurality of keys each responsive to the oscillatory signals at a different one of the frequencies for providing individual tactile stimulation to particular ones of the fingers of the second operator in accordance with the frequencies of the oscillatory signals.

3. In combination for providing a tactile communication of information from a first position by a first operator to a second position, for reception and assimilation of the information by a second operator, a first plurality of buttons disposed at the first position in spaced relationship to one another for actuation by the different fingers of the first operator, a second plurality of keys disposed at the first position in spaced relationship to one another for actuation by the different fingers of the first operator, a plurality of oscillators each coupled to a different one of the keys and operative upon an actuation of the coupled keys to produce signals having a distinctive frequency relative to the frequencies of the signals produced by the other oscillators, means including a mixer coupled to the oscillators in the plurality for mixing the oscillatory signals for transmission, means including a mixer and including detector means electrically connected in different channels and disposed at the second position and responsive to the transmitted signals for separating the transmitted signals into the different channels in accordance with the different frequencies in the transmitted signals, and a plurality of keys disposed in spaced relationship at the second position and responsive to the signals in the different channels for producing tactile stimulations to the different fingers of the second operators at the frequencies of the signals in the channels.

4. The combination set forth in claim 3 in which the oscillators are constructed to provide individual frequencies in the range between 20 cycles per second and 8,000 cycles per second such that the frequency of the signals produced by each oscillator is distinctive regardless of the different combinations of signals produced by the other oscillators.

References Cited in the file of this patent

UNITED STATES PATENTS

| | | |
|---|---|---|
| 1,409,386 | McQuanie | Mar. 14, 1922 |
| 1,733,605 | Jones | Oct. 29, 1929 |
| 2,012,924 | Conklin | Aug. 27, 1935 |
| 2,150,364 | Dudley | Mar. 14, 1939 |
| 2,282,102 | Tunick | May 5, 1942 |